(12) United States Patent
Rosvall et al.

(10) Patent No.: US 11,041,249 B2
(45) Date of Patent: Jun. 22, 2021

(54) ELECTRODE

(71) Applicant: Akzo Nobel Chemicals International B.V., Arnhem (NL)

(72) Inventors: Magnus Rosvall, Gothenburg (SE); Bernth Nordin, Sundsbruk (SE)

(73) Assignee: NOURYON CHEMICALS INTERNATIONAL B.V., Arnhem (NL)

( * ) Notice: Subject to any disclaimer, the term of this patent is extended or adjusted under 35 U.S.C. 154(b) by 400 days.

(21) Appl. No.: 15/761,124

(22) PCT Filed: Sep. 22, 2016

(86) PCT No.: PCT/EP2016/072505
§ 371 (c)(1),
(2) Date: Mar. 19, 2018

(87) PCT Pub. No.: WO2017/050867
PCT Pub. Date: Mar. 30, 2017

(65) Prior Publication Data
US 2018/0258543 A1    Sep. 13, 2018

(30) Foreign Application Priority Data
Sep. 25, 2015  (EP) ..................... 15186815

(51) Int. Cl.
*C25B 11/051* (2021.01)
*C25B 11/061* (2021.01)
(Continued)

(52) U.S. Cl.
CPC ........ *C25B 11/051* (2021.01); *C02F 1/46109* (2013.01); *C25B 11/061* (2021.01); *C25B 11/093* (2021.01); *C02F 2001/46142* (2013.01)

(58) Field of Classification Search
CPC .. C25B 1/34; C25B 1/26–1/265; C25B 11/00; C25B 11/0405; C25B 11/0442;
(Continued)

(56) References Cited

U.S. PATENT DOCUMENTS 3,755,103 A * 8/1973 Grotheer .................. C25B 1/46
                                                           205/518
4,039,400 A * 8/1977 Hayfield ............. C25B 11/0484
                                                           205/171
(Continued)

FOREIGN PATENT DOCUMENTS

CN         1030617 A    1/1989
CN         1900368 A    1/2007
(Continued)

OTHER PUBLICATIONS

International Search Report and Written Opinion for PCT/EP2016/072505, dated Nov. 29, 2016.
(Continued)

*Primary Examiner* — Alexander W Keeling
(74) *Attorney, Agent, or Firm* — Lorenz & Kopf, LLP (57) ABSTRACT

An electrode (10) is disclosed in which a first layer (30) of $TiO_x$ with a porosity in the range 0-3% is present on at least one surface of an electrode substrate (20), a second layer (40) of $TiO_x$ with a porosity of greater than 3 and up to 20% is present on the first layer (30) of $TiO_x$. An electro-catalytic layer (50) is present on the second layer (40) of $TiO_x$. x is in the range 1-2 for the first (30) and second layer (40) of $TiO_x$. A process for the manufacture of the electrode (10) is disclosed as are uses thereof.

18 Claims, 1 Drawing Sheet

(51) Int. Cl.
  *C25B 11/093* (2021.01)
  *C02F 1/461* (2006.01)

(58) Field of Classification Search
  CPC ........ C25B 11/0447–11/0468; C25B 11/0478; C25B 11/0494; C02F 1/46109; C02F 2001/46133; C02F 1/46138; C02F 1/46142
  See application file for complete search history.

(56) References Cited

U.S. PATENT DOCUMENTS

| | | |
|---|---|---|
| 4,140,813 A | 2/1979 | Hund et al. |
| 4,422,917 A * | 12/1983 | Hayfield .................. C25C 7/02 204/196.01 |
| 4,524,091 A | 6/1985 | Blaauw et al. |
| 4,900,419 A | 2/1990 | Nishiki et al. |
| 5,665,218 A | 9/1997 | Ashizawa et al. |
| 2004/0151896 A1 | 8/2004 | Houda et al. |

FOREIGN PATENT DOCUMENTS

| | | |
|---|---|---|
| CN | 102471904 A | 5/2012 |
| CN | 102918184 A | 2/2013 |
| EP | 0 298 055 A1 | 1/1989 |
| GB | 1 443 502 A | 7/1976 |
| WO | 2011/012596 A1 | 2/2011 |
| WO | 2011012596 A1 | 2/2011 |
| WO | 2011/157811 A1 | 12/2011 |
| WO | 2011157811 A1 | 12/2011 |
| WO | 2017/050873 A1 | 3/2017 |

OTHER PUBLICATIONS

European Search Report for 15186815.5-1360 dated Apr. 1, 2016.
Zeradjanin et al., Utilization of the catalyst layer of dimensionally stable anodes—Interplay of morphology and active surface area, Electrochimica Acta, 2012, 408-414.
Massimo Guglielmi, Sol-Gel Coatings on Metals, Journal of Sol-Gel Science and Technology, vol. 8., 1997, 443-449.
Hachiya et al, 2009, 'Ruthenium Oxide Cathodes for Chlor-Alkali Electrolysis', ECS Transactions, vol. 16, pp. 31-39.

* cited by examiner

ELECTRODE

This application is a national stage filing under 35 U.S.C. § 371 of PCT/EP2016/072505, filed Sep. 22, 2016, which claims priority to European Patent Application No. 15186815.5, filed Sep. 25, 2015, the contents of each of which are each incorporated herein by reference in their entirety.

FIELD OF INVENTION

The present invention relates to an electrode, the electrode has a first and a second layer of $TiO_x$ on an electrode substrate. The first and second layers of $TiO_x$ have a different porosity. An electro-catalytic layer is present on the second layer of $TiO_x$. The present invention relates to a use of the electrode and a process for the manufacture of an electrode.

BACKGROUND OF INVENTION

Electrodes and processes for a manufacture of electrodes are known in the art.

U.S. Pat. No. 4,140,813 discloses a process for the manufacture of an electrode, in particular an anode. The process comprises, producing a coating of titanium oxide by flame or plasma spraying on a surface of an electrode substrate (metal passive e.g. titanium). The titanium oxide is $TiO_y$ ($0.1 \leq y \leq 0.99$). The process further comprises applying to the coating of titanium oxide an electrochemically active substance of a platinum group metal compound. The coating of titanium oxide in U.S. Pat. No. 4,140,813 exhibits poor adhesion to the surface of the electrode substrate. The electrode exhibits poor longevity when used in an electrolysis process.

U.S. Pat. No. 4,039,400 discloses a process for the manufacture of an electrode. The process comprises inserting an electrode substrate into a solution of titanium ions and forming a first electro-coating of titanium oxide by electro-coating the solution of titanium ions onto the electrode substrate by drying and calcination. The process is repeated to form a second electro-coating of titanium oxide on the first electro-coating of titanium oxide. The process further comprises applying a metal or an oxide thereof of the platinum group to the second electro-coating of titanium oxide. The formation of electrodes according to U.S. Pat. No. 4,039,400 is time consuming, since the electro-coatings require extensive initial drying and subsequent calcination at high temperatures before subsequent electro-coatings can be applied. The electro-coatings of U.S. Pat. No. 4,039,400 manufactured according to the process exhibit cracking and poor adhesion of the electro-coatings to the electrode substrate and poor adhesion of the first and second electro-coatings to each other.

There is a need to provide an electrode with improved adhesion of a first titanium oxide layer (i.e. coating) to a second titanium oxide layer (i.e. coating).

There is a need to provide an electrode with improved overall adhesion of the titanium oxide layer(s) (i.e. coating(s)) to the electrode substrate.

The known electrodes have limitations when used in an electrolysis process, such as a production of alkali metal chlorate. The known electrodes require reactivation when the electrolysis process is stopped. A reactivation of the electrodes is a time consuming and/or an energy intense process. The reactivation of the electrodes causes delays in the electrolysis process due to down time when the electrodes need to be reactivated. There is a need to provide electrodes which maintain efficiency in the electrolysis process and to minimise costs for stops of plants to reactivate the electrodes. There is a need to provide electrodes with high activity to minimise energy consumption when the electrode is used in the electrolysis process.

There is a need to provide electrodes with enhanced longevity, especially when used in the electrolysis process.

There is a need to provide a process for the manufacture of an electrode which improves an overall adhesion of titanium oxide layers (i.e. coatings) to an electrode substrate. There is a need to provide a process for the manufacture of an electrode whereby an adhesion of the layers of titanium oxide coatings to an electrode substrate is uniform. There is a need to provide a process for the manufacture of an electrode whereby the layers of titanium oxide coatings do not exhibit cracking.

There is a need to overcome at least some of the aforementioned problems.

SUMMARY OF INVENTION

In a first aspect, the present invention relates to an electrode. The electrode comprising:
  an electrode substrate,
  a first layer of $TiO_x$ with a porosity of between 0-3% on at least one surface of the electrode substrate,
  a second layer of $TiO_x$ with a porosity of greater than 3 and up to 20% on the first layer of $TiO_x$,
  an electro-catalytic layer on the second layer of $TiO_x$; and
    wherein x is between 1-2 for the first and second layer of $TiO_x$.

It was found that the porosity of the $TiO_x$ layers had a number of surprising effects. The electrode exhibits enhanced adhesion of the first layer of $TiO_x$ to the electrode substrate and enhanced adhesion of the second layer of $TiO_x$ to the first layer of $TiO_x$. The first layer of $TiO_x$ and the second layer of $TiO_x$ attached to electrode substrate are devoid of any cracking. The electrode does not require reactivation when an electrolysis process is stopped, thus saving time and energy. Furthermore the electro-catalytic layer exhibits improved adhesion to the second layer of $TiO_x$.

In a further aspect, the present invention relates to a use of the electrode in an electrolytic process. The electrode has enhanced longevity when used in the electrolysis process, in particular when used in the manufacture of alkali metal chlorate which is a chemically harsh environment.

In a further aspect, the present invention relates to a process of manufacturing an electrode. The process comprising the steps:
  (i) providing an electrode substrate,
  (ii) coating at least one surface of the electrode substrate by plasma spraying to form a first layer of $TiO_x$ with a porosity of between 0-3%,
  (iii) coating by plasma spraying on the first layer of $TiO_x$ to form a second layer of $TiO_x$ with a porosity of greater than 3 and up to 20%,
  (iv) coating an electro-catalytic layer on the second layer of $TiO_x$; and wherein
    x is between 1-2 for the first and second layer of $TiO_x$.

It was found that during the process, the porosity of the $TiO_x$ layers and the manner in which they were applied forms an electrode that exhibits enhanced adhesion of the first layer of $TiO_x$ to the electrode substrate and enhanced adhesion of the second layer of $TiO_x$ to the first layer of $TiO_x$. Furthermore the process ensures that first layer of $TiO_x$ attached to the electrode substrate and the second layer of $TiO_x$ attached to the electrode substrate are devoid of any cracking. The process allows for the rapid manufacture of the electrode. The process ensures that the electro-catalytic layer exhibits improved adhesion on the second layer of $TiO_x$.

In a further aspect, the present invention relates to an electrode obtainable by the process.

DETAILED DESCRIPTION

Figure 1:
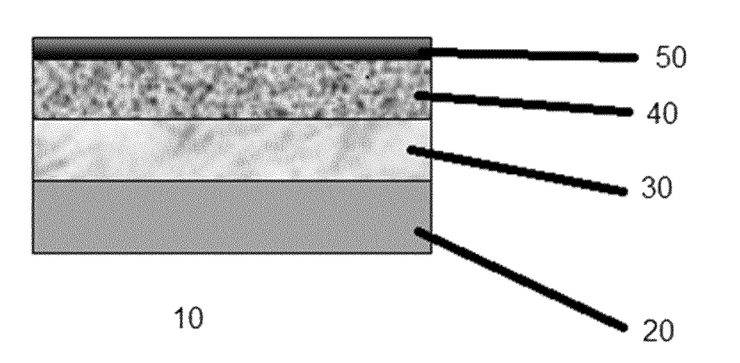
FIG. 1 shows a cross section of an electrode according to an aspect of the present invention.

For a complete understanding of the present invention and the advantages thereof, reference is made to the following detailed description taken in conjunction with the accompanying FIGURE.

It should be appreciated that the various aspects and embodiments of the detailed description as disclosed herein are illustrative of the specific ways to make and use the invention and do not limit the scope of invention when taken into consideration with the claims and the detailed description. It will also be appreciated that features from different aspects and embodiments of the invention may be combined with features from different aspects and embodiments of the invention.

In a first aspect the present invention relates to an electrode 10. The electrode 10 comprises:
  an electrode substrate 20,
  a first layer 30 of $TiO_x$ with a porosity of between 0-3% on at least one surface of the electrode substrate 20,
  a second layer 40 of $TiO_x$ with a porosity of greater than 3 and up to 20% on the first layer 30 of $TiO_x$,
  an electro-catalytic layer 50 on the second layer 40 of $TiO_x$; and wherein
  x is between 1-2 for the first 30 and second layer 40 of $TiO_x$.

The electrode substrate 20 can be any one of steel or iron. The electrode substrate 20 can be an alloy of iron comprising at least one of the metals molybdenum, tungsten, chromium, and titanium or any combination of these metals. The electrode substrate 20 can be any one of the metals titanium, tantalum, tungsten, zirconium, hafnium or niobium or an alloy thereof. The electrode substrate 20 is preferably titanium or an alloy thereof.

Where the electrode substrate 20 is titanium it is preferable that the titanium is selected, according to the American Society of Testing Materials (ASTM) from one of:
  B313: 6-4 Titanium in Sheet, Strip and Plate
  5-2.5 Titanium in Sheet, Strip and Plate
  Commercially Pure Grade 1 Titanium in Sheet, Strip and Plate
  Commercially Pure Grade 2 Titanium in Sheet, Strip and Plate
  B314: Commercially Pure Grade 4 Titanium in Sheet, Strip and Plate
  Commercially Pure Grade 7 Titanium in Sheet, Strip and Plate
  B316: Commercially Pure Grade 11 Titanium in Sheet, Strip and Plate
  Commercially Pure Grade 12 Titanium in Sheet, Strip and Plate The aforementioned types of electrode substrate 20 retain their physical and chemical integrity, also during manufacture of the electrode 10 and during its use, for e.g. in an electrolytic cell when used in an electrolytic process.

A configuration of the electrode substrate 20 and therefore the resulting electrode 10 may be in the form of a flat sheet or plate, a curved surface, a convoluted surface, a punched plate, a woven wire screen, an expanded mesh sheet, a rod, or a tube. The electrode substrate 20 preferably has a configuration of a planar shape, in the form of the flat sheet, mesh or plate.

The first layer 30 of $TiO_x$ has a porosity of between 0-3% and the first layer 30 of $TiO_x$ is present on at least one surface of the electrode substrate 20. The first layer 30 of $TiO_x$ may have a porosity in the range 0.1-2.5%, and more preferably in the range 0.5-1.8%.

The second layer 40 of $TiO_x$ has a porosity of greater than 3 and up to 20% and the second layer 40 of $TiO_x$ is present on the first layer 30 of $TiO_x$. The second layer 40 of $TiO_x$ may have a porosity of greater than 3 and up to 15%, preferably in the range 5-15%, and more preferably in the range 5-10%.

Due to the porosity of the first layer 30 of $TiO_x$ and the porosity of the second layer 40 of $TiO_x$ it is to be appreciated that the first layer 30 of $TiO_x$ is denser than the second layer 40 of $TiO_x$.

A total thickness of the first layer 30 of $TiO_x$ and the second layer 40 of $TiO_x$ is preferably between 40-190 μm. It is more preferable that the total thickness of the first layer 30 of $TiO_x$ and the second layer 40 of $TiO_x$ is between 60-150 μm.

It is preferable that a thickness of the first layer 30 of $TiO_x$ is at least 20 μm. It is preferable that a thickness of second layer 40 of $TiO_x$ is at least 20 μm. Where a thickness of the first layer 30 of $TiO_x$ is at least 20 μm, there is uniform coverage of the first layer 30 of $TiO_x$ on the electrode substrate 20. Where a thickness of the second layer 40 of $TiO_x$ at least 20 μm, there is uniform coverage of the second layer 40 of $TiO_x$ on the first layer 30 of $TiO_x$.

It is preferable that a thickness of the first layer 30 of $TiO_x$ is thicker than a thickness of the second layer 40 of $TiO_x$. It is preferable that a thickness of the first layer 30 of $TiO_x$ is thicker than a thickness of the second layer 40 of $TiO_x$ in the magnitude range of between 2-4 and more preferably in the magnitude range of between 2-3.

The thickness the first layer 30 of $TiO_x$, the second layer 40 of $TiO_x$ and the total thickness of both layers are determined according to an ASTM Designation F1854-98-Standard Test Method for Stereological Evaluation of Porous Coatings on Medical Implants.

x is between 1-2 for the first 30 and second layer 40 of $TiO_x$. When x is between 1-2, an optimal balance between corrosion resistance and electrical conductivity is achieved in the electrode 10. It is preferable that x is between 1.6-1.99 and even more preferable that x is between 1.7-1.9 for each or either the first 30 and second layer 40 of $TiO_x$. It has been found that where x is in the preferred range there is an increase in corrosion resistance of the electrode 10.

It is to be appreciated that value x can be readily determined by common general knowledge using various spectroscopic techniques.

The electro-catalytic layer 50 layer can be an oxide of titanium and ruthenium according to general formula $Ru_xTi_{(1-x)}O_y$. x can range from between 0.5-1, preferably x ranges from between 0.6-1, more preferably x ranges from between 0.8-1 and even more preferably x ranges from between 0.9-1. y is up to 2. It is appreciated that there can be any combination of x and y.

It is preferable that a metal(s) and/or metal oxides content of the electro-catalytic layer 50 is in the range of between 1-40 gm$^{-2}$, more preferably in the range of between 1-20 gm$^{-2}$ and even more preferably in the range of between 1.5-18 gm$^{-2}$.

The porosity of the first layer 30 of TiO$_x$ and the second layer 40 of TiO$_x$ is measured according to ISO/TR26946 (E)-Standard method for porosity measurement of thermally sprayed coatings as described below.

In this method the electrode 10 is cut into square specimens with sides of about 15 mm by means of a precision saw to form an electrode specimen. The electrode specimen is embedded with an epoxy resin (Struers Specifix-20) in a mounting cup with a diameter of 30 mm. The epoxy resin is cured at room temperature for about 8 hours and post-treated at 50° C. for 2 hours to improve resin hardness.

The mounted electrode specimen is ground by SiC paper with grit sizes of 180, 320, 800 and 1200 in turn for 2 minutes each turn, lubricated with water at a circling speed of 300 rpm using rotation with a force of 20N per stub (cylinder of mounted electrode). After the mounted electrode specimens are polished using water based diamond suspensions of 6, 3 and 1 μm grade (Struers DiaPro). Complementary rotation at a speed of 150 rpm for 6 minutes was used for each step. After polishing, the samples were cleaned with demineralised water, swabbed with lint-free tissue and allowed to air dry.

To determine the porosity by Secondary Electron Microscopy (SEM), the polished electrode specimen was adhered to an aluminium stub using double sided conductive tape. To facilitate charge drainage, an electric connection from the top to the stub was made using conductive tape. In order to prevent charging in the SEM, a thin carbon coating was applied using a Balzers MED 010 sputter coater. SEM images were recorded on a Zeiss LEO 1550 FE-SEM, equipped with an Oxford PentaFET-3x detector. Backscattered electron mode was used at a work distance of ~5.5 mm, using a quadruple backscattered electron detector. The primary electron energy was 10 keV. A minimum of 5 random areas (all above 0.12 mm$^2$) per electrode specimen were imaged. Three batches of electrode specimen were polished at different times giving a minimum of 15 images for each porosity level.

A quantitative assessment of the porosity is carried out by image analysis on the basis that for random distributed pores the surface fraction is equal to volumetric fraction of pores.

The images were analysed using ImageJ software. The images were cropped to a rectangular shape that excludes the interface between the mounting resin and the first 30 and second layer 40 of TiO$_x$ and between the first 30 and second layer 40 of TiO$_x$ and the electrode substrate 20. Images were then binarised using the "default" automatic threshold algorithm provided by ImageJ (http://fiji.sc/wiki/index.oho/Auto Threshold). The noise was then removed by means of a despeckle filter. The area fraction represents the porosity by volume.

In a further aspect of the present invention, the electrode 10 is used as a cathode in an electrolytic process. The electrode 10 may be used in an electrolytic cell for a reduction of water-based electrolytes to hydrogen and hydroxide ions. The electrode 10 may be used in an electrolytic cell for the manufacture of alkali metal chlorate or alkali metal hydroxide. The electrode 10 may be used in an electrolytic cell for treatment of water.

The electrolytic process can be the manufacture of alkali metal chlorate. In this electrolytic process, the electrode 10 can be installed into a chlorate cell as a cathode. As an anode an electrode known in the art can be used. An electrolyte with a composition of NaClO$_3$ 600±50 gL$^{-1}$, NaCl 110±10 gL$^{-1}$, NaClO 3±1 gL$^{-1}$ and Na$_2$Cr$_2$O$_7$*2H$_2$O 4±3 gL$^{-1}$ all of which were dissolved in deionized water were used. The electrolyte in the electrolytic process can be maintained at a temperature of approximately 70±20° C.

The chlorate cell can be polarised to a current density of between 0.8-5 kA/m$^2$, and more preferably to a current density of between 2-3 kA/m$^2$.

The electrode 10 may be used as an anode and/or a cathode.

The electrode 10 may be part of a bipolar electrode that is to say that the electrode 10 functions as an anode of one cell and a cathode of another cell. When the electrode 10 is bipolar electrode, the cathode side is according to the present invention and the anode side is according to an electrode known in the art, depending on the final application. When used as a bipolar electrode, the electrode 10 provides a more compact cell system which circumvents a need for backplates in the cell. Furthermore the electrode 10 when used as a bipolar electrode can be easily replaced if need be.

In a further aspect the present invention relates to a process of manufacturing an electrode 10. It is to be appreciated that the process of manufacturing the electrode 10, relates to the electrode 10 as previously described.

The process of manufacturing the electrode 10 comprises the steps:

(i) providing an electrode substrate 20, (ii) coating at least one surface of the electrode substrate 20 by plasma spraying to form a first layer 30 of TiO$_x$ with a porosity of between 0-3%, (iii) coating by plasma spraying on the first layer 30 of TiO$_x$ to form a second layer 40 of TiO$_x$ with a porosity of greater than 3 and up to 20%, (iv) coating an electro-catalytic layer 50 on the second layer 40 of TiO$_x$; and wherein x is between 1-2 for the first and second layer of TiO$_x$.

The electrode substrate 20 is provided by any one of those as previously mentioned.

The electrode substrate 20 may be pre-treated by a cleaning procedure and/or a roughening procedure and/or a pickling procedure or any combination thereof prior to the coating step (ii).

The cleaning procedure is used to remove impurities present on a surface of the electrode substrate 20. The impurities may adversely affect adhesion of the first layer 30 of TiO$_x$ to the at least one surface of the electrode substrate 20. The impurities include stains, such as oils and fats; cutting wastes; and salts. The cleaning procedure includes any one of alcohol washing, alkaline washing, acid washing, ultrasonic cleaning, steam cleaning and scrubbing cleaning or any combination thereof. The cleaning procedure further includes washing of the electrode substrate with water and drying.

The roughening procedure is used to roughen a surface of the electrode substrate 20. The roughening procedure includes any one of machining the electrode substrate 20, blasting the electrode substrate 20 with particulates or laser etching or any combination thereof. It is preferable that the roughening procedure is blasting the electrode substrate 20 with particulates. As the surface of the electrode substrate 20 is roughened, a surface area of the electrode substrate 20 increases. The increase in the surface area of the electrode substrate 20 provides a means for mechanical interlocking for the first layer 30 of TiO$_x$ when coated on at least one surface of the electrode substrate 20 and improves its mechanical adhesion.

The particulates include sand, grit, and aluminium oxide or any combination thereof. It is preferable that the particulates are selected from aluminium oxide. It is preferable that the particulates have an average particle size of between 50-300 μm. The particulates are blasted at the electrode substrate 20 to roughen the surface of the electrode substrate 20. The particulates are blasted at the electrode substrate 20 with a pressure of between 1.5-5 bar and can be directed to the surface of the electrode substrate 20 at an angle of between 45-60°. Following blasting the electrode substrate 20 with particulates, the electrode substrate 20 is cleaned as mentioned above and subjected to compressed air to remove any remaining particulates.

It is preferable that the roughening procedure is done by a robotically controlled movement during the machining, blasting, or laser etching over the electrode substrate 20.

It is preferable that the roughening procedure is used to roughen a surface of the electrode substrate 20 to provide a $R_a$ value in the range of between 1-6 μm, preferably in the range of between 1-5 μm and most preferably in the range of between 2-4 μm. The $R_a$ value is measured according to SS-EN ISO 4287:1998.

The pickling procedure is a process in which the electrode substrate 20 is treated in acid at a temperature in the range of between 60-90° C. The acid can be selected from one of hydrochloric acid, nitric acid, sulphuric acid and phosphoric acid. The acid can be an aqueous acid with between 10-50 wt % acid. The electrode substrate 20 can be treated in the aqueous acid for a time of up to 8 hours. Where the electrode substrate 20 is roughened, the pickling procedure may not be preferred, this is because the pickling procedure smoothens away the roughness, which may comprise an ability of the first layer 30 of $TiO_x$ to adhere to the at least one surface of the electrode substrate 20 during the plasma spraying process.

Coating at least one surface of the electrode substrate 20 by plasma spraying to form the first layer 30 of $TiO_x$ and coating by plasma spraying on the first layer 30 of $TiO_x$ to form the second layer 40 of $TiO_x$ is achieved by plasma spraying a powder of $TiO_x$ to form the respective layers 30 and 40.

The powder of $TiO_x$ may be provided by Oerlikon Metco (Metco 102). The powder of $TiO_x$ may be provided by Oerlikon Metco (Metco 6231A).

An example of plasma spraying is described in U.S. Pat. No. 4,140,813. Plasma spraying may be achieved using a Triplex II plasma spraying system by Oerlikon Metco, a TriplexPro-200 plasma spraying system by Oerlikon Metco or a F4 plasma spraying system by Oerlikon Metco.

Plasma spraying is advantageous in that it allows the creation of uniform layers 30 and 40 of $TiO_x$. Plasma spraying is advantageous in that it allows the creation of layers 30 and 40 of $TiO_x$ with the desired thickness easily. Plasma spraying is advantageous in that it allows the creation of layers of $TiO_x$ 30 and 40 with the desired porosity by altering parameter settings of the plasma spray gun process such as speed, energy, temperature and gas composition.

It is preferable that a speed at which the powder of $TiO_x$ is applied is in the range of between 30-670 ms$^{-1}$ during the plasma spray gun process.

It is preferable that a temperature during the plasma spray gun process is in the range of between 1000-3500° C.

It is preferable that the energy during the plasma spray gun process is in the range of between 300-600 Amps.

The gas composition is at least one of helium, hydrogen, nitrogen or argon or any combination thereof.

The gas composition preferably comprises at least one of argon or nitrogen as these gases are advantageous for the flow and particle entrainment of the powder of $TiO_x$ during the plasma spraying process. The gas composition preferably also comprises in addition to at least one of argon or nitrogen, at least one of hydrogen and helium as these gases are advantageous for heat transfer to the powder of $TiO_x$ during the plasma spraying process.

In order to achieve the layers of $TiO_x$ 30 and 40 with the desired porosity, the important parameters (gas composition and amperage) can be according to table 1.

TABLE 1

| Parameter setting of plasma gun spray parameters | | |
|---|---|---|
| Porosity target value of TiOx layer type | c.a. 0-3% | c.a. 3-8% |
| Ar [nlpm] | 25-45 | 50-70 |
| N$_2$ [nlpm] | 0 | 1-5 |
| He [nlpm] | 20-40 | 0 |
| Amperage [A] | 475 ± 75 | 425 ± 75 |

Further adjustment of the porosity is preferably carried out by adjusting the amperage (lower amperage, higher porosity).

It is preferable that the gas is applied with a flow rate in the range of between 0-80 nlpm (normal litres per minute).

Once the aforementioned parameters have been stabilised for the plasma spray gun process, the powder of $TiO_x$ is plasma sprayed on the electrode substrate 20 to form the coating on at least one surface of the electrode substrate 20 to form the first layer 30 of $TiO_x$.

The powder of $TiO_x$ is plasma sprayed on the electrode substrate 20 preferably in a direction perpendicular to the electrode substrate 20 where the electrode substrate 20 is flat. However when the powder of $TiO_x$ is plasma sprayed on edges of the electrode substrate 20 it is preferable that the powder of $TiO_x$ is plasma sprayed on the electrode substrate 20 preferably at an angle of 45° to the electrode substrate 20 to ensure uniform coverage to the electrode substrate 20.

The powder of $TiO_x$ is plasma sprayed on the electrode substrate 20 at a distance of 175 mm±50 mm from a tip of a plasma spray gun to the electrode substrate 20 and more preferably at a distance of 150 mm.

To achieve the first layer 30 of $TiO_x$ the plasma spraying process can be repeated in a stepwise procedure. By repeating the plasma spraying process it has been found that this provides better control in forming the layer and has the advantage of filling in cracks in the previously applied layer. By repeating the plasma spraying process the desired thickness of the first layer 30 of $TiO_x$ can be achieved in a stepwise manner.

It is preferable that the powder of $TiO_x$ is plasma sprayed by a robot controlled movement over the electrode substrate 20.

During the coating procedure, the electrode substrate 20 may be rotated so more surfaces are coated to form the first layer 30 of $TiO_x$.

Once the first layer 30 of $TiO_x$ has been formed on the electrode substrate 20, the parameter settings of the plasma spray gun process are accordingly altered and the coating procedure as described above is repeated (with respective changes made to achieve the desired porosity) to form the second layer 40 of $TiO_x$ on the first layer 30 of $TiO_x$.

The electro-catalytic layer 50 is then coated on the second layer 40 of $TiO_x$.

Before application of the electro-catalytic layer 50 on the second layer 40, it is preferable that the surface of the second layer 40 has a surface roughness $R_a$ value in the range of between 2-20 μm, more preferably in the range of between 5-15 μm and even more preferably in the range of between 8-12 μm. The surface roughness may be achieved as a result of the plasma spraying process. The surface roughness may be achieved by the roughening procedure as described previously. The $R_a$ value is measured according to SS-EN ISO 4287:1998. It has been found that having a surface roughness in the aforementioned ranges as well as the porosity of the second layer 40 of $TiO_x$ provides an ability to form a good chemical bond between the electro-catalytic layer 50 and the second layer 40 of $TiO_x$.

The electro-catalytic layer 50 can be coated on the second layer 40 of $TiO_x$ by any one of a thermal spray method, a thermal decomposition method, a sol-gel method, a paste method, an electrophoresis method, a physical vapour deposition (PVD) method and an atomic layer deposition (ALD) method.

It is preferable that the electro-catalytic layer 50 is coated on the second layer 40 of $TiO_x$ by the thermal decomposition method according to the following procedure.

A solution or suspension of the electro-catalytic layer compounds is applied on the second layer 40 of $TiO_x$ heated to dry and then a thermolysis is performed. This process is repeated, as required to achieve the desired loading of the electro-catalytic layer 50.

It is preferable that the solution or suspension of the electro-catalytic layer compounds comprises an acid. The acid is preferably a mineral acid such as hydrochloric acid. A solvent used for the formation of the solution or suspension of the electro-catalytic layer compounds can be an aqueous solvent which may comprise at least one alcohol. The alcohol is selected from one of methanol, ethanol, 1-propanol, 2-propanol, 1-butanol, 2-butanol, 1-pentanol, 2-pentanol and 3-methyl-2-butanol or any combination thereof. Where the solvent is an aqueous solvent which comprises at least one alcohol, it is preferable that the solvent comprises at least 50 volume % alcohols. It is preferable that the solvent is 1-butanol and/or water as this solvent mixture optimises a wetting of the second layer 40 of $TiO_x$.

The electro-catalytic layer compounds, which are dissolved in a preferable solution described above, can be a salt and/or an acid of the resultant electro-catalytic layer 50 for example, chlorides, nitrides, nitrites nitrates, iodides, bromides, sulphates, borates, carbonates, acetates, and citrates or any combination thereof.

It is preferable that the electro-catalytic layer compounds are ruthenium and titanium compounds for example, $RuCl_3$, $RuCl_4$, $TiCl_3$, $TiCl_4$, $Ti(C_4H_9O)_4$ or any combination thereof.

Once the solution or suspension of the electro-catalytic layer compounds is applied on the second layer 40 of $TiO_x$, the thermolysis is then performed as mentioned.

During the thermolysis, the electro-catalytic layer compounds form the electro-catalytic layer 50 on the second layer 40 of $TiO_x$. The thermolysis causes a conversion of the electro-catalytic layer compounds to metals and/or the oxides thereof. The thermolysis is carried out at temperature in the range of between 200-700° C., preferably in the range of between 350-600° C. and even more preferably in the range of between 450-550° C.

It is preferable that the metals and/or oxides content of the electro-catalytic layer 50 is in the range of between 1-40 $gm^{-2}$, more preferably in the range of between 1-20 $gm^{-2}$ and even more preferably in the range of between 1.5-18 $gm^2$.

The electro-catalytic layer 50 layer can be an oxide of titanium and ruthenium according to general formula $Ru_xTi_{(1-x)}O_y$ as previously mentioned.

The invention also relates to an electrode obtainable by the process as described herein.

The present invention is demonstrated by the following non-limiting examples.

EXAMPLES

1. Coating Electrode Substrate with $TiO_x$ Layer(s) of Different Porosities

Electrode substrates (titanium plates) were degreased and cleaned using alcohol.

The surfaces of the electrode substrate were subjected to a roughening procedure by blasting the surfaces with particulates of aluminium oxide at a blasting pressure of 3 bar to provide a $R_a$ value of approximately 3 μm.

Following the blasting procedure, the electrode substrate was cleaned, degreased and then subjected to compressed air in order to remove loose particulates.

A powder of $TiO_x$ by Oerlikon Metco (Metco 6231A) was used.

Various layers of $TiO_x$ with various porosities were developed on the electrode substrate with a TriplexPro 200 according to table 2.

TABLE 2

| | Porosity of $TiO_x$ layers developed | | | |
|---|---|---|---|---|
| $TiO_x$ layer type | D | P1 | P2 | DP2 |
| Porosity (%) | 2.4 | 3.2 | 5.4 | 2.4 and 5.4 |
| Standard error (%) | 0.2 | 0.3 | 0.5 | 0.2 and 0.5 |
| Thickness (μm) | 50 ± 10 | 60 ± 20 | 60 ± 20 | 70 ± 20 |

From table 2 it is observed that the electrode substrate coated with the D $TiO_x$ layer type has a porosity in the range 0-3%, the electrode substrate coated with the P1 $TiO_x$ layer type has a porosity greater than 3 and up to 20%, the electrode substrate coated with the P2 $TiO_x$ layer type has a porosity greater than 3 and up to 20% and the electrode substrate coated with the DP2 $TiO_x$ layer type is according to the present invention.

To achieve the porosities of table 2, the plasma gun spray parameters were set according to table 3.

TABLE 3

| Parameter setting of plasma gun spray parameters | | | |
|---|---|---|---|
| Porosity value of $TiO_x$ layer type | 2.4% (D) | 3.2% (P1) | 5.4% (P2) |
| Ar [nlpm] | 35 ± 10 | 60 ± 10 | 60 ± 10 |
| $N_2$ [nlpm] | 0 | 3 ± 2 | 3 ± 2 |
| He [nlpm] | 30 ± 10 | 0 | 0 |
| Amperage [A] | 475 ± 75 | 450 ± 50 | 400 ± 50 |

2. Adhesion Properties of $TiO_x$ Layer(s) of Different Porosities to Electrode Substrate A test was developed to measure the adhesion properties of $TiO_x$ layer(s) of different porosities to the electrode substrate that were manufactured according example 1.

A solid titanium cylinder of 8.16 mm diameter was blasted on its flat surface with particulates of aluminium oxide at a blasting pressure of 3 bar to provide a $R_a$ value of approximately 3 μm.

To each one of the $TiO_x$ coated electrode substrates according to example 1, the flat surface of the titanium cylinder was glued using an epoxy and then left to harden overnight.

An adhesion tester (PAT model GM01/6.3 kN) was then used to pull up the titanium cylinders to determine the adhesion strength of the $TiO_x$ layer(s) of different porosities to the electrode substrate. The results are shown in table 4.

TABLE 4

Adhesion strength of $TiO_x$ layer to electrode substrate

| $TiO_x$ layer type on electrode substrate | D | P1 | P2 | DP2 |
|---|---|---|---|---|
| Adhesion strength to electrode substrate [MPa] | 10 | 7.2 | 5.8 | 8.7 |

The D $TiO_x$ layer has the best adhesion to the titanium substrate. Upon pulling up the titanium cylinder, the $TiO_x$ layer remained adhered to the electrode substrate. The DP2 $TiO_x$ layer (according to the present invention) had good adhesion to the titanium substrate. Upon pulling up the titanium cylinder, the DP2 $TiO_x$ layer remained adhered to the electrode substrate. Upon pulling up the titanium cylinder the P1 and P2 $TiO_x$ layers had unsatisfactory adhesion to the titanium substrate, the $TiO_x$ layer pulled away from the electrode substrate and remained adhered to the titanium cylinder.

3. Manufacture of Electrodes

Four solution(s) or suspension(s) a-d for forming the electro-catalytic layer were prepared according to tables 5a-4d.

TABLE 5a

Composition a for forming the electro-catalytic layer

| Chemicals | Concentration (gL$^{-1}$) | mol % |
|---|---|---|
| Ruthenium | 57 | 45 |
| Titanium | 33.2 | 55 |
| HCl 37% | 42 ml L$^{-1}$ | 0 |
| 1-Butanol | To end volume | 0 |

TABLE 5b

Composition b for forming the electro-catalytic layer

| Chemicals | Concentration (gL$^{-1}$) | mol % |
|---|---|---|
| Ruthenium | 100 | 100 |
| HCl 37% | 50 ml L$^{-1}$ | 0 |
| 1-Butanol | To end volume | 0 |

TABLE 5c

Composition c for forming the electro-catalytic layer

| Chemicals | Concentration (gL$^{-1}$) | mol % |
|---|---|---|
| Ruthenium | 101.3 | 80 |
| Titanium | 12.1 | 20 |

TABLE 5c-continued

Composition c for forming the electro-catalytic layer

| Chemicals | Concentration (gL$^{-1}$) | mol % |
|---|---|---|
| HCl 37% | 50 ml L$^{-1}$ | 0 |
| 1-Butanol | To end volume | 0 |

TABLE 5d

Composition d for forming the electro-catalytic layer

| Chemicals | Concentration (gL$^{-1}$) | mol % |
|---|---|---|
| Ruthenium | 76 | 60 |
| Titanium | 24.1 | 40 |
| HCl 37% | 50 ml L$^{-1}$ | 0 |
| 1-Butanol | To end volume | 0 |

The compounds for the compositions were provided as:

Ruthenium as ruthenium(III)chloride hydrate 37-42 wt % Ru from Hereaus.

Titanium as tetrabutylortotitanate $Ti(C_4H_9O)_4$, 14 wt % Ti. Density 1,0038 gcm$^{-3}$ from Fisher Scientific.

HCl 37% HCl quality puriss.

1-Butanol $C_4H_9OH$ quality puriss.

The coating compositions were manufactured by weighing the ruthenium compound and/or titanium compound into which the hydrochloric acid and a small amount of 1-butanol were added with stirring. The mixture was stirred and heated to about 70° C. to dissolve the ruthenium compound and/or titanium compound. After cooling the solution was diluted with 1-butanol and the volume was adjusted to its end volume.

The various coating compositions a-d were sprayed on the $TiO_x$ layered electrode substrates with a laboratory air gun.

The $TiO_x$ layered electrode substrates coated with the electro-catalytic layer were dried for 10-12 minutes at 80-110° C. and then thermolysed for 10-12 minutes at 470° C. This was repeated until a total coating load of the ruthenium electro-catalytic layer of 8-24 gm$^{-2}$ was achieved (as shown in table 6).

4. Various Electrodes and Lifespan

A number of various electrodes (1-11) coated with $TiO_x$ layers (D, P1, P2 or D/P2) and the relevant electro-catalytic layer 5a-5d were manufactured according to table 6.

As a control, electrodes 1 and 2 were manufactured according to example 1 in U.S. Pat. No. 4,140,813 using an Oerlikon Metco F4 plasma spray system with electro-catalytic layer a and d respectively.

Electrodes 3-11 were manufactured using an Oerlikon Metco Triplex II plasma spraying system with the electro-catalytic layer as indicated.

The $TiO_x$ layers D, P1 and P2 refer to the following $TiO_x$ layers:

D: $TiO_{1.83\pm0.05}$ with a porosity of 2.4±0.2%.

P1: $TiO_{1.83\pm0.05}$ with a porosity of 3.2±0.3%.

P2: $TiO_{1.83\pm0.05}$ with a porosity of 5.4±0.5%.

D/P2: a combination of the above—i.e. according to the present invention.

TABLE 6

Various electrodes coated with TiO$_x$ layers (D, P1, P2 and D/P2)

| Electrode | TiO$_x$ layer type | TiO$_x$ layer thickness (Mm) | mol % RuO$_2$/TiO$_2$ in catalyst | electro-catalytic layer | Ru gm$^{-2}$ in catalyst |
|---|---|---|---|---|---|
| 1 | not analysed | 50 ± 10 | 45 ± 5 | a | 10 ± 2 |
| 2 | not analysed | 50 ± 10 | 60 ± 5 | d | 16 ± 2 |
| 3 | D | 50 ± 10 | 60 ± 5 | d | 14 ± 2 |
| 4 | D | 50 ± 10 | 80 ± 5 | c | 20 ± 2 |
| 5 | P1 | 60 ± 20 | 60 ± 5 | d | 15 ± 2 |
| 6 | P1 | 60 ± 20 | 80 ± 5 | c | 22 ± 2 |
| 7 | P2 | 60 ± 20 | 60 ± 5 | d | 16 ± 2 |
| 8 | P2 | 60 ± 20 | 80 ± 5 | c | 22 ± 2 |
| 9 | P2 | 60 ± 20 | 100 ± 5 | b | 21 ± 2 |
| 10 | D/P2 | 70 ± 20 | 60 ± 5 | d | 15 ± 2 |
| 11 | D/P2 | 70 ± 20 | 100 ± 5 | b | 20 ± 2 |

The electrodes 1-11 were used in an electrolytic cell for manufacturing alkali metal chlorate. The electrodes 1-11 were used as cathodes. The anodes were of a titanium base with a PSC120 coating (a DSA® coating from Permascand).

An electrolyte was a chlorate electrolyte of: NaCl (110±10 gL$^{-1}$), NaClO$_3$ (600±50 gL$^{-1}$) NaClO (3±1 gL$^{-1}$) and a Na$_2$Cr$_2$O$_7$*2H$_2$O (3-4 gL$^{-1}$) all of which were dissolved in deionized water. A temperature was maintained at 70-75° C.

The electrodes 1-11 were tested to analyse their longevity. The longevity is the time from when the electrode was installed to the time where a dramatic failure of the electrode took place e.g. a short, a failure to electrolyses or dramatic increase in potential.

Furthermore in order to accelerate wear of the electrode a current density in the electrolytic cell was raised to 3.9 kAm$^{-2}$ the first month and then maintained at 3.5 kAm$^{-2}$. Furthermore random stops were introduced into the electrolytic cell to increase wear of the electrodes. During each stop the current is terminated while the electrolyte continues to flow. The longevity of the electrodes is shown in table 7.

TABLE 7 longevity of the electrodes

| Electrode | Life (days) | Nr Stops |
|---|---|---|
| 1 | 100 ± 5 | 10 |
| 2 | 100 ± 10 | 10 |
| 3 | 154 ± 5 | 15 |
| 4 | 137 ± 5 | 13 |
| 5 | 144 ± 5 | 14 |
| 6 | 119 ± 5 | 10 |
| 7 | 131 ± 5 | 12 |
| 8 | 151 ± 5 | 14 |
| 9 | 151 ± 5 | 14 |
| 10 | 210 ± 10 | 23 |
| 11 | 310 ± 10 | 34 |

The results demonstrate that using a TiO$_x$ layer in the electrode as example 1 (electrode 1 and 2 above) in U.S. Pat. No. 4,140,813, the electrodes have relatively short longevity.

Electrodes 3 and 4 with only a single layer of TiO$_x$ with a similar Ru-load in the electro-catalytic coating have a similar longevity.

The longevity of electrodes with TiO$_x$ layer in the electrode as example 1 (electrodes 1 and 2) in U.S. Pat. No. 4,140,813, is not significantly affected by the RuO$_2$/TiO$_2$ content of the electro-catalytic layer.

The longevity of electrodes with TiO$_x$ layer D (electrodes 3 and 4) is slightly better than electrodes 1 and 2, however it is improved by lower RuO$_2$/TiO$_2$ content of the electro-catalytic layer.

The longevity of electrodes with TiO$_x$ layer P1 (electrodes 5 and 6) is slightly better than electrodes 1 and 2, however it is improved by lower RuO$_2$/TiO$_2$ content of the electro-catalytic layer.

The longevity of electrodes with TiO$_x$ layer P2 (electrodes 7, 8 and 9) is slightly better than electrodes 1 and 2, however higher longevity is observed with higher RuO$_2$:TiO$_2$ ratio of the electro-catalytic layer.

The longevity of electrodes with TiO$_x$ layers D and P2 according to the invention shows a dramatic increase in longevity and is more pronounced with higher RuO$_2$/TiO$_2$ content of the electro-catalytic layer. This is even where the total thickness when having two TiO$_x$ layers D and P2 is the same thickness of a single TiO$_x$ layer.

Having thus described the present invention and the advantages thereof, it should be appreciated that the various aspects and embodiments of the present invention as disclosed herein are merely illustrative of specific ways to make and use the invention.

The various aspects and embodiments of the present invention do not limit the scope of the invention when taken into consideration with the appended claims and the foregoing detailed description.

What is desired to be protected by letters patent is set forth in the following claims.

What is claimed is:

1. A cathode comprising:
   a cathode substrate comprising titanium and/or an alloy thereof and having at least one surface;
   a first layer of TiO$_x$ with a porosity of from 0.1% to 3% disposed on the at least one surface of the cathode substrate;
   a second layer of TiO$_x$ with a porosity of greater than 3% and up to 20% disposed on the first layer of TiO$_x$; and
   an electro-catalytic layer disposed on the second layer of TiO$_x$ and comprising RuO$_2$,
   wherein x is from 1 to 1.99 for the first and second layers of TiO$_x$, and
   wherein a thickness of the first layer of TiO$_x$ is at least 20 μm and a thickness of the second layer of TiO$_x$ is at least 20 μm.

2. The cathode according to claim 1, wherein a total thickness of the first layer of TiO$_x$ and the second layer of TiO$_x$ is from 40 to 190 μm.

3. The cathode according to claim 1, wherein x is from 1.6 to 1.9 for the first layer of TiO$_x$ or the second layer of TiO$_x$.

4. The cathode according to claim 1, wherein the electro-catalytic layer further comprises Ru$_x$Ti$_{1-x}$O$_y$, wherein x of the Ru$_x$Ti$_{1-x}$O$_y$ is from 0.5 to 1 and y of the Ru$_x$Ti$_{1-x}$O$_y$ is up to 2.

5. The cathode according to claim 1, wherein the electro-catalytic layer has a metals and/or oxides content of from 1 to 40 g/m$^2$.

6. A method comprising using the cathode of claim 1 as a cathode in an electrolytic process.

7. The method according to claim 6, wherein the electrolytic process comprises manufacture of alkali metal chlorate.

8. A process of manufacturing a cathode, the process comprising the steps of:
   (i) providing a cathode substrate comprising titanium and/or an alloy thereof;

(ii) coating at least one surface of the cathode substrate by plasma spraying to form a first layer of $TiO_x$ with a porosity of from 0.1% to 3%;

(iii) coating by plasma spraying on the first layer of $TiO_x$ to form a second layer of $TiO_x$ with a porosity of greater than 3% and up to 20%; and (iv) coating an electro-catalytic layer on the second layer of $TiO_x$, wherein x is from 1 to 1.99 for the first and second layers of $TiO_x$, thereby forming the cathode comprising:

the cathode substrate having the at least one surface;

the first layer of $TiO_x$ with a porosity of from 0.1% to 3% disposed on the at least one surface of the cathode substrate;

the second layer of $TiO_x$ with a porosity of greater than 3% and up to 20% disposed on the first layer of $TiO_x$; and the electro-catalytic layer disposed on the second layer of $TiO_x$ and comprising $RuO_2$, wherein a thickness of the first layer of $TiO_x$ is at least 20 μm and a thickness of the second layer of $TiO_x$ is at least 20 μm.

9. The process according to claim 8, wherein the at least one surface of the cathode substrate is roughened to provide an $R_a$ value of from 1 to 6 μm prior to step (ii).

10. The process according to claim 9, wherein the roughened cathode substrate does not undergo a pickling procedure.

11. The process according to claim 8, wherein coating the electro-catalytic layer on the second layer of $TiO_x$ further comprises thermolysis of a combination of ruthenium and titanium compounds.

12. The process according to claim 8, wherein coating the electro-catalytic layer on the second layer of $TiO_x$ provides a metals and/or oxides content of from 1 to 40 g/m² to the electro-catalytic layer.

13. The cathode according to claim 1, wherein a total thickness of the first layer of $TiO_x$ and the second layer of $TiO_x$ is from 40 to 190 μm wherein the first layer has a porosity either of from 0.1 to 2.5% or from 0.5 to 1.8%;

a thickness of the first layer of $TiO_x$ and a thickness of second layer of $TiO_x$ is at least 20 μm;

x is from 1.6 to 1.9 for the first layer of $TiO_x$ and/or the second layer of $TiO_x$; and the electro-catalytic layer has a metals and/or oxides content of from 1 to 40 g/m².

14. The cathode according to claim 1 wherein the first layer has a porosity of from 0.1 to 2.5%.

15. The cathode according to claim 13, wherein the cathode substrate is Commercially Pure Grade 1 Titanium.

16. The cathode according to claim 1, wherein the cathode substrate is Commercially Pure Grade 1 Titanium.

17. The process according to claim 8, wherein the cathode substrate is Commercially Pure Grade 1 Titanium.

18. The process according to claim 1, wherein the first and second layers are devoid of cracking.

* * * * *